US011041054B2

(12) United States Patent
Minakuchi et al.

(10) Patent No.: US 11,041,054 B2
(45) Date of Patent: Jun. 22, 2021

(54) INTERMEDIATE FILM FOR LAMINATED GLASSES, METHOD FOR PRODUCING INTERMEDIATE FILM FOR LAMINATED GLASSES, AND LAMINATED GLASS (71) Applicant: SEKISUI CHEMICAL CO., LTD., Osaka (JP)

(72) Inventors: Nami Minakuchi, Kouka (JP); Tatsuya Iwamoto, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/124,923

(22) PCT Filed: Mar. 31, 2015

(86) PCT No.: PCT/JP2015/060211
§ 371 (c)(1),
(2) Date: Sep. 9, 2016

(87) PCT Pub. No.: WO2015/152274
PCT Pub. Date: Oct. 8, 2015

(65) Prior Publication Data
US 2017/0022335 A1 Jan. 26, 2017

(30) Foreign Application Priority Data
Mar. 31, 2014 (JP) .............................. JP2014-073753

(51) Int. Cl.
B32B 17/10 (2006.01)
B32B 27/22 (2006.01)
B32B 27/30 (2006.01)
C08J 5/18 (2006.01)
C08K 5/00 (2006.01)
C08K 5/10 (2006.01)
C08L 29/14 (2006.01)

(52) U.S. Cl.
CPC ............ C08J 5/18 (2013.01); B32B 17/10036 (2013.01); B32B 17/10761 (2013.01); C08L 29/14 (2013.01); B32B 2250/02 (2013.01); B32B 2250/03 (2013.01); C08J 2329/14 (2013.01); C08J 2429/14 (2013.01); C08L 2205/025 (2013.01)

(58) Field of Classification Search
CPC ............................. C08J 5/18; B32B 17/10761
See application file for complete search history.

(56) References Cited

U.S. PATENT DOCUMENTS

| 5,190,826 A | 3/1993 | Asahina et al. |
| 2007/0134487 A1 | 6/2007 | Marumoto |
| 2009/0305058 A1 | 12/2009 | Marumoto |
| 2011/0229714 A1 | 9/2011 | Morikawa et al. |
| 2012/0003482 A1 | 1/2012 | Toyama et al. |
| 2012/0021231 A1 | 1/2012 | Hirota et al. |
| 2012/0041123 A1 | 2/2012 | Ootsuki et al. |
| 2012/0171479 A1* | 7/2012 | Fukatani ........... B32B 17/10633 428/340 |
| 2013/0149503 A1 | 6/2013 | Yamamoto et al. |
| 2013/0157065 A1* | 6/2013 | Shimamoto ....... B32B 17/10036 428/442 |
| 2013/0189528 A1 | 7/2013 | Matsuda et al. |
| 2016/0053102 A1* | 2/2016 | Asanuma ................ C08L 29/14 428/437 |
| 2016/0347035 A1* | 12/2016 | Komatsu et al. |
| 2016/0376413 A1* | 12/2016 | Sasaki et al. |

FOREIGN PATENT DOCUMENTS

| CN | 103153904 A | 6/2013 |
| CN | 104944806 A | 9/2015 |
| EP | 2 977 403 A1 | 1/2016 |
| EP | 3 109 212 A1 | 12/2016 |
| EP | 3 109 214 A1 | 12/2016 |
| JP | 56-145132 A | 11/1981 |
| JP | 3-124733 A | 5/1991 |
| JP | 10-25390 A | 1/1998 |
| JP | 2002-104878 A | 4/2002 |
| JP | 2002-326844 A | 11/2002 |
| JP | 2003-252656 A | 9/2003 |
| JP | 2007-70200 A | 3/2007 |
| JP | 2007-284648 A | 11/2007 |
| JP | 4712122 B2 | 6/2011 |
| JP | 2013-91591 A | 5/2013 |

(Continued)

OTHER PUBLICATIONS

International Search Report for the Application No. PCT/JP2015/060211 dated Jun. 16, 2015.
Written Opinion of the International Searching Authority (PCT/ISA/237) for Application No. PCT/JP2015/00211 dated Jun. 16, 2015.
Supplementary European Search Report for the Application No. EP 15 77 3726 dated Aug. 17, 2017.
Database WPI, Week 199127, Thomson Scientific, London, GB; AN 1991-198572, XP002772770 (and JP H03-124733 A).
Database WPI, Week 199814, Thomson Scientific, London, GB; AN 1998-154105, XP002772772 (and JP H10-25390 A).
Database WPI, Week 200258, Thomson Scientific, London, GB; AN 2002-541273, XP002772771 (and JP 2002-104878 A).
Database WPI, Week 200333, Thomson Scientific, London, GB; AN 2003-346041, XP002772769 (and JP 2002-326844 A).

(Continued)

Primary Examiner — Melissa A Rioja
(74) Attorney, Agent, or Firm — Cheng Law Group, PLLC (57) ABSTRACT There is provided an interlayer film for laminated glass with which the transparency can be enhanced. The interlayer film for laminated glass according to the present invention is obtained by mixing a first film material containing a first polyvinyl acetal resin and a second film material containing a second polyvinyl acetal resin and a plasticizer, and the absolute value of the difference between the content of the hydroxyl group of the first polyvinyl acetal resin and the content of the hydroxyl group of the second polyvinyl acetal resin contained together with the plasticizer in the second film material is less than or equal to 13% by mole.

19 Claims, 1 Drawing Sheet (56) References Cited

FOREIGN PATENT DOCUMENTS

| JP | 5469279 B1 | 4/2014 |
|---|---|---|
| RU | 2 405 744 C2 | 12/2010 |
| RU | 2 415 091 C2 | 3/2011 |
| WO | WO 2010/095749 A1 | 8/2010 |
| WO | WO-2012/029916 A1 | 3/2012 |

OTHER PUBLICATIONS

Database WPI, Week 200403, Thomson Scientific, London, GB; AN 2004-026528, XP002772773 (and JP 2003-252656 A).
Database WPI, Week 201335, Thomson Scientific, London, GB; AN 2013-H17809, XP002772774 (and JP 2013-091591 A).
Written Opinion of the International Searching Authority (PCT/ISA/237) for Application No. PCT/JP2015/060211 dated Jun. 16, 2015 (English Translation dated Oct. 13, 2015).
The First Office Action for the Application No. 201580016691.7 from the State Intellectual Property Office of the People's Republic of China dated Apr. 23, 2018.
Russian Office Action for Application No. 2016142188/05(067577) dated Oct. 17, 2018.
The Second Office Action for the Application No. 201580016691.7 from the State Intellectual Property Office of the People's Republic of China dated Jan. 31, 2019.
Examination Report for the Application No. 201637030101 from the Intellectual Property India Office dated May 31, 2019.
European Office Action for the Application No. 15 773 726.3 dated Mar. 6, 2019.
European Office Action for Application No. 15 773 726.3 dated Nov. 25, 2019.

\* cited by examiner

INTERMEDIATE FILM FOR LAMINATED GLASSES, METHOD FOR PRODUCING INTERMEDIATE FILM FOR LAMINATED GLASSES, AND LAMINATED GLASS

TECHNICAL FIELD

The present invention relates to an interlayer film for laminated glass used for laminated glass and a method for producing the interlayer film for laminated glass. Moreover, the present invention relates to laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film between a pair of glass plates.

As an example of the interlayer film for laminated glass, the following Patent Document 1 discloses a sound insulating layer including 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount of greater than 30 parts by weight. This sound insulating layer can be used alone as a single-layered interlayer film.

Furthermore, the following Patent Document 1 also describes a multilayer interlayer film in which the sound insulating layer and another layer are layered. Another layer to be layered with the sound insulating layer includes 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount less than or equal to 30 parts by weight.

RELATED ART DOCUMENT

Patent Document

Patent Document 1: JP 2007-070200 A

SUMMARY OF THE INVENTION

Problems to be Solved by the Invention

In recent years, for the purpose of reducing the environmental load, a technique for reusing such an interlayer film for laminated glass (a recovered interlayer film) described in Patent Document 1 as a part of the raw material of a new interlayer film for laminated glass has been studied. However, when an interlayer film is reused as a part of the raw material of a new interlayer film for laminated glass, there are cases where the transparency of the interlayer film for laminated glass is lowered due to an existence state of a thermoplastic resin such as a polyvinyl acetal resin.

An object of the present invention is to provide an interlayer film for laminated glass with which the transparency can be enhanced and a method for producing the interlayer film for laminated glass. Further specifically, an object of the present invention is to provide an interlayer film for laminated glass with which the transparency can be enhanced even when different kinds of polyvinyl acetal resins are combinedly used, and a method for producing the interlayer film for laminated glass. Moreover, the present invention is also aimed at providing laminated glass prepared with the interlayer film for laminated glass.

Means for Solving the Problems

According to a broad aspect of the present invention, there is provided an interlayer film for laminated glass being obtained by mixing a first film material containing a first polyvinyl acetal resin and a second film material containing a second polyvinyl acetal resin and a plasticizer, the absolute value of the difference between the content of the hydroxyl group of the first polyvinyl acetal resin and the content of the hydroxyl group of the second polyvinyl acetal resin contained together with the plasticizer in the second film material being less than or equal to 13% by mole.

In a specific aspect of the interlayer film for laminated glass according to the present invention, the content of the hydroxyl group of the first polyvinyl acetal resin is higher than the content of the hydroxyl group of the second polyvinyl acetal resin contained together with the plasticizer in the second film material.

In a specific aspect of the interlayer film for laminated glass according to the present invention, the content of the second polyvinyl acetal resin is greater than or equal to 0.1% by weight and less than or equal to 10% by weight in 100% by weight of the total of the first polyvinyl acetal resin and the second polyvinyl acetal resin.

In a specific aspect of the interlayer film for laminated glass according to the present invention, the content of the second polyvinyl acetal resin is greater than or equal to 0.1% by weight and less than or equal to 10% by weight in 100% by weight of the total of all polyvinyl acetal resins included in the interlayer film.

In a specific aspect of the interlayer film for laminated glass according to the present invention, the second film material contains the plasticizer in an amount of greater than or equal to 40 parts by weight and less than or equal to 80 parts by weight relative to 100 parts by weight of the second polyvinyl acetal resin.

In a specific aspect of the interlayer film for laminated glass according to the present invention, the first film material is a fresh material which has not been used for obtaining an interlayer film.

In a specific aspect of the interlayer film for laminated glass according to the present invention, the second film material is a recovered material which has been used at least one time for obtaining an interlayer film.

In a specific aspect of the interlayer film for laminated glass according to the present invention, the interlayer film for laminated glass is obtained by mixing the first film material, the second film material and a third film material containing a third polyvinyl acetal resin and a plasticizer, and the absolute value of the difference between the content of the hydroxyl group of the first polyvinyl acetal resin and the content of the hydroxyl group of the third polyvinyl acetal resin contained together with the plasticizer in the third film material is less than or equal to 13% by mole.

In a specific aspect of the interlayer film for laminated glass according to the present invention, the content of the hydroxyl group of the first polyvinyl acetal resin is higher than the content of the hydroxyl group of the third polyvinyl acetal resin contained together with the plasticizer in the third film material.

In a specific aspect of the interlayer film for laminated glass according to the present invention, the third film material is a recovered material which has been used at least one time for obtaining an interlayer film.

According to a broad aspect of the present invention, there is provided a method for producing an interlayer film for laminated glass including the step of using a first film material containing a first polyvinyl acetal resin and a second film material containing a second polyvinyl acetal resin and a plasticizer and mixing the first film material and the second film material to obtain an interlayer film for laminated glass, the absolute value of the difference between the content of the hydroxyl group of the first polyvinyl acetal resin and the content of the hydroxyl group of the second polyvinyl acetal resin contained together with the plasticizer in the second film material being less than or equal to 13% by mole.

In a specific aspect of the method for producing an interlayer film for laminated glass according to the present invention, the content of the hydroxyl group of the first polyvinyl acetal resin is higher than the content of the hydroxyl group of the second polyvinyl acetal resin contained together with the plasticizer in the second film material.

According to a broad aspect of the present invention, there is provided laminated glass including a first laminated glass member, a second laminated glass member and an interlayer film for laminated glass described above, wherein the interlayer film for laminated glass is arranged between the first laminated glass member and the second laminated glass member.

Effect of the Invention

With regard to the interlayer film for laminated glass according to the present invention and the method for producing an interlayer film for laminated glass according to the present invention, since the interlayer film is obtained by mixing a first film material containing a first polyvinyl acetal resin and a second film material containing a second polyvinyl acetal resin and a plasticizer and the absolute value of the difference between the content of the hydroxyl group of the first polyvinyl acetal resin and the content of the hydroxyl group of the second polyvinyl acetal resin contained together with the plasticizer in the second film material is less than or equal to 13% by mole, it is possible to enhance the transparency of the interlayer film.

MODE(S) FOR CARRYING OUT THE INVENTION

Hereinafter, the details of the present invention will be described.

(1) The interlayer film for laminated glass according to the present invention (hereinafter, sometimes abbreviated as the interlayer film) is obtained by mixing a first film material containing a first polyvinyl acetal resin and a second film material containing a second polyvinyl acetal resin and a plasticizer. The absolute value of the difference between the content of the hydroxyl group of the first polyvinyl acetal resin and the content of the hydroxyl group of the second polyvinyl acetal resin contained together with the plasticizer in the second film material is less than or equal to 13% by mole. In the interlayer film according to the present invention, the second polyvinyl acetal resin is mixed with the plasticizer before being mixed with the first polyvinyl acetal resin. Accordingly, the interlayer film according to the present invention is different from an interlayer film obtained by mixing a first polyvinyl acetal resin, a second polyvinyl acetal resin which has not been mixed with a plasticizer and a plasticizer.

Since the interlayer film according to the present invention is provided with the above-described configuration, and in particular, a first polyvinyl acetal resin and a second polyvinyl acetal resin which are close to each other in the absolute value of the difference between contents of the hydroxyl group are used, with regard to the interlayer film according to the present invention, the transparency can be enhanced.

1) The first film material may be a recovered material which has been used at least one time for obtaining an interlayer film (a recovered interlayer film) and the second film material may be a recovered material which has been used at least one time for obtaining an interlayer film (a recovered interlayer film), 2) the first film material may be a fresh material which has not been used for obtaining an interlayer film (a raw material) and the second film material may be a recovered material which has been used at least one time for obtaining an interlayer film (a recovered interlayer film), 3) the first film material may be a recovered material which has been used at least one time for obtaining an interlayer film (a recovered interlayer film) and the second film material may be a fresh material which has not been used for obtaining an interlayer film (a raw material), and 4) the first film material may be a fresh material which has not been used for obtaining an interlayer film (a raw material) and the second film material may be a fresh material which has not been used for obtaining an interlayer film (a raw material). From the viewpoint of enhancing the recyclability to reduce the environmental load, among the above-mentioned constitutions 1), 2), 3) and 4), the above-mentioned constitutions 1), 2) and 3) are preferred, and the above-mentioned constitution 1) is more preferred. From the viewpoint of obtaining an interlayer film having a stable quality, among the above-mentioned constitutions 1), 2), 3) and 4), the above-mentioned constitutions 2), 3) and 4) are preferred, and the above-mentioned constitution 4) is more preferred.

For the purpose of obtaining the interlayer film according to the present invention, a third film material containing a polyvinyl acetal resin and a plasticizer may be further used together with the first film material and the second film material. From the viewpoint of obtaining an interlayer film having a stable quality, the third film material may be a fresh material which has not been used for obtaining an interlayer film (a raw material) and from the viewpoint of enhancing the recyclability to reduce the environmental load, the third film material may be a recovered material which has been used at least one time for obtaining an interlayer film (a recovered interlayer film).

Examples of the recovered material which has been used at least one time for obtaining an interlayer film (the recovered interlayer film) include unwanted portions (waste pieces) at both ends of an interlayer film which are generated in a production process of the interlayer film, unwanted portions (trimmings) at the periphery of an interlayer film which are generated in a production process of laminated glass, an interlayer film for laminated glass obtained by separating and removing glass plates from a defective product of laminated glass generated in a production process of laminated glass, and an interlayer film obtained by separating and removing glass plates from laminated glass obtained by disassembling a used vehicle and a decrepit building. In this connection, an interlayer film which is generated in a production process of an interlayer film and becomes unnecessary corresponds to a recovered material which has been used at least one time for obtaining an interlayer film.

The fresh material which has not been used for obtaining an interlayer film refers to a newly prepared material and does not refer to a recovered material.

Hereinafter, the present invention will be elucidated by describing specific embodiments and examples of the present invention with reference to the drawings.

Figure 1:
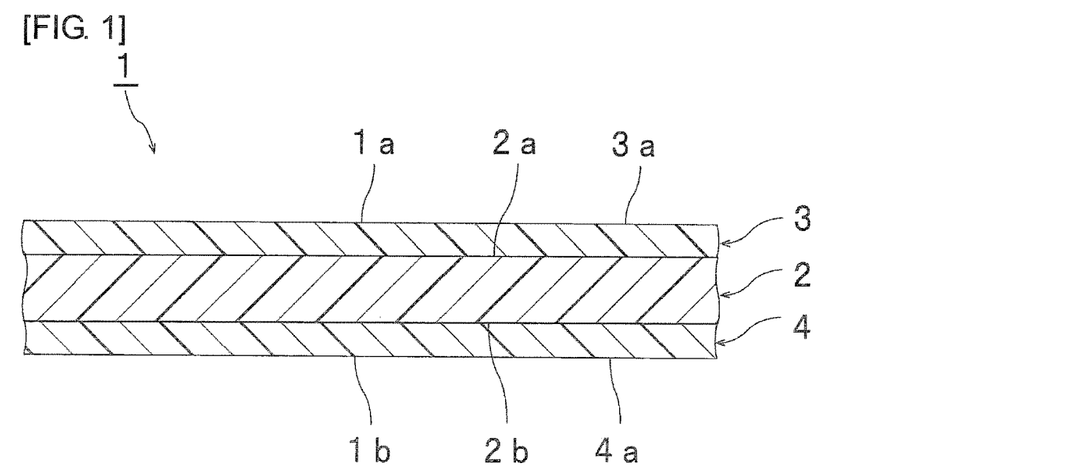
FIG. 1 is a partially cut-away sectional view schematically showing a multi-layered interlayer film including an interlayer film for laminated glass in accordance with the first embodiment of the present invention.

FIG. 1 shows a multi-layered interlayer film including an interlayer film for laminated glass in accordance with one embodiment of the present invention schematically represented as a partially cut-away sectional view.

An interlayer film 1 shown in FIG. 1 is a multi-layered interlayer film having a two or more-layer structure. The interlayer film 1 has a two or more-layered structure. The interlayer film 1 is used for obtaining laminated glass. The interlayer film 1 is an interlayer film for laminated glass. The interlayer film 1 is provided with a first layer 2, a second layer 3 arranged on a first surface 2a side of the first layer 2, and a third layer 4 arranged on a second surface 2b side opposite to the first surface 2a of the first layer 2. The second layer 3 is layered on the first surface 2a of the first layer 2. The third layer 4 is layered on the second surface 2b of the first layer 2. The first layer 2 is an intermediate layer. For example, the second layer 3 and the third layer 4 are protective layers and are surface layers in the present embodiment. The first layer 2 is arranged between the second layer 3 and the third layer 4 to be sandwiched. Accordingly, the interlayer film 1 has a multilayer structure in which the second layer 3, the first layer 2 and the third layer 4 are layered in this order.

It is preferred that a surface 3a at a side opposite to the first layer 2 side of the second layer 3 be a surface on which a laminated glass member is layered. It is preferred that a surface 4a at a side opposite to the first layer 2 side of the third layer 4 be a surface on which a laminated glass member is layered.

In this connection, other layers may be arranged between the first layer 2 and the second layer 3 and between the first layer 2 and the third layer 4, respectively. It is preferred that each of the second layer 3 and the third layer 4 be directly layered on the first layer 2. Examples of another layer include a layer containing a thermoplastic resin such as a polyvinyl acetal resin and a layer containing polyethylene terephthalate.

From the viewpoint of further enhancing the penetration resistance of laminated glass prepared with the interlayer film, it is preferred that the first layer 2 contain at least one kind of a thermoplastic resin and it is more preferred that the first layer 2 contain a polyvinyl acetal resin and a plasticizer, it is preferred that the second layer 3 contain at least one kind of a thermoplastic resin and it is more preferred that the second layer 3 contain a polyvinyl acetal resin and a plasticizer, and it is preferred that the third layer 4 contain at least one kind of a thermoplastic resin and it is more preferred that the third layer 4 contain a polyvinyl acetal resin and a plasticizer.

In the multi-layered interlayer film 1 shown in FIG. 1, at least one layer among the first layer 2, the second layer 3 and the third layer 4 constitutes an interlayer film corresponding to the interlayer film according to the present invention. The first layer 2 may constitute an interlayer film corresponding to the interlayer film according to the present invention, the second layer 3 may constitute an interlayer film corresponding to the interlayer film according to the present invention, and the third layer 4 may constitute an interlayer film corresponding to the interlayer film according to the present invention. In the case of being a multi-layered interlayer film with a three-layer structure, it is preferred that the surface layer constitute an interlayer film corresponding to the interlayer film according to the present invention. Even when the interlayer film according to the present invention is used as a surface layer (an interlayer film), it is possible to improve the transparency.

Figure 2:
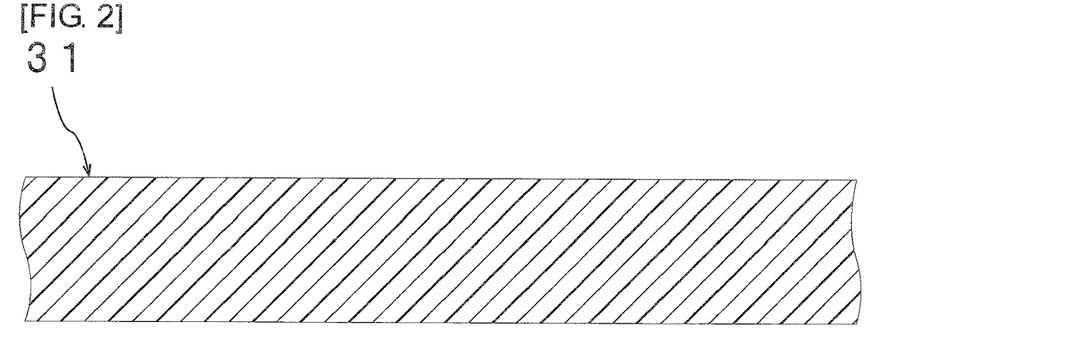
FIG. 2 is a partially cut-away sectional view schematically showing an interlayer film for laminated glass in accordance with the second embodiment of the present invention.

FIG. 2 shows an interlayer film for laminated glass in accordance with another embodiment of the present invention schematically represented as a partially cut-away sectional view.

The interlayer film 31 shown in FIG. 2 is a single-layered interlayer film having a one-layer structure. The interlayer film 31 is a first layer. The interlayer film 31 is used for obtaining laminated glass. The interlayer film 31 is an interlayer film for laminated glass. The interlayer film 31 is an interlayer film corresponding to the interlayer film according to the present invention.

The interlayer film according to the present invention, 1) like the interlayer film 31, may be used as a single-layered interlayer film for obtaining laminated glass, 2) like the interlayer film 1, may be used as one constituent layer in a multi-layered interlayer film together with other interlayer films for obtaining laminated glass, and 3) like the interlayer film 1, may be used as each of all constituent layers in a multi-layered interlayer film for obtaining laminated glass.

With regard to the interlayer film 1, the second layer 3 and the third layer 4 each are layered on both faces of the first layer 2, respectively. The second layer needs only to be arranged on the first surface side of the first layer. The second layer is arranged on the first surface side of the first layer, and the third layer does not need to be arranged on the second surface side of the first layer. In this context, the second layer is arranged on the first surface side of the first layer, and it is preferred that the third layer be arranged on the second surface side of the first layer. By allowing the third layer to be arranged on the second surface side of the first layer, the handling properties of the interlayer film and the penetration resistance of laminated glass are further enhanced. Furthermore, at the surfaces of both sides of the interlayer film, the adhesivity to a laminated glass member and the like can be adjusted. In this connection, in the case where the third layer is absent, the adhesivity of an outer surface of the second layer of the interlayer film to a laminated glass member can be adjusted.

Hereinafter, the details of each ingredient included in the interlayer film for laminated glass according to the present invention will be described.

(Thermoplastic Resin)

The interlayer film includes a polyvinyl acetal resin as a thermoplastic resin. The interlayer film may include a thermoplastic resin different from the polyvinyl acetal resin. The first film material contains a first polyvinyl acetal resin, and thus, the interlayer film includes the first polyvinyl acetal resin. The second film material contains a second polyvinyl acetal resin, and thus, the interlayer film includes the second polyvinyl acetal resin. The third film material contains a third polyvinyl acetal resin. The interlayer film may include a third polyvinyl acetal resin. The interlayer film may further include another thermoplastic resin as long as the interlayer film includes the first polyvinyl acetal resin and the second polyvinyl acetal resin. The second polyvinyl acetal resin and the third polyvinyl acetal resin may be different from each other.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and a polyester resin.

From the viewpoint of effectively enhancing the transparency, it is preferred that the content of the hydroxyl group of the first polyvinyl acetal resin be higher than the content of the hydroxyl group of the second polyvinyl acetal resin. From the viewpoint of sufficiently enhancing the transparency, the absolute value of the difference between the content of the hydroxyl group of the first polyvinyl acetal resin and the content of the hydroxyl group of the second polyvinyl acetal resin is less than or equal to 13% by mole. From the viewpoint of further effectively improving the transparency, the absolute value of the difference is preferably less than or equal to 12% by mole, more preferably less than or equal to 11% by mole, further preferably less than or equal to 10% by mole, especially preferably less than or equal to 9.5% by mole and most preferably less than or equal to 8.5% by mole. From the viewpoint of further effectively improving the transparency, the absolute value of the difference between the content of the hydroxyl group of the first polyvinyl acetal resin and the content of the hydroxyl group of the second polyvinyl acetal resin may be greater than 0% by mole or may be equal to 0% by mole (both contents thereof may be the same as each other), may be greater than or equal to 0.5% by mole, may be greater than or equal to 1% by mole, and furthermore, may be greater than or equal to 4% by mole.

From the viewpoint of further effectively improving the transparency, it is preferred that the content of the hydroxyl group of the first polyvinyl acetal resin be higher than the content of the hydroxyl group of the third polyvinyl acetal resin. From the viewpoint of further effectively improving the transparency, the absolute value of the difference between the content of the hydroxyl group of the first polyvinyl acetal resin and the content of the hydroxyl group of the third polyvinyl acetal resin is preferably less than or equal to 9.5% by mole, more preferably less than or equal to 5% by mole, further preferably less than or equal to 3% by mole, especially preferably less than or equal to 2% by mole and most preferably less than or equal to 1% by mole. The absolute value of the difference between the content of the hydroxyl group of the first polyvinyl acetal resin and the content of the hydroxyl group of the third polyvinyl acetal resin may be greater than 0% by mole or may be equal to 0% by mole (both contents thereof may be the same as each other), may be greater than or equal to 0.5% by mole, may be greater than or equal to 1% by mole, and furthermore, may be greater than or equal to 4% by mole.

The content of the hydroxyl group (the amount of hydroxyl groups) of the first polyvinyl acetal resin is preferably greater than or equal to 20% by mole, more preferably greater than or equal to 25% by mole, further preferably greater than or equal to 28% by mole, preferably less than or equal to 40% by mole, more preferably less than or equal to 36% by mole and further preferably less than or equal to 33% by mole. When the content of the hydroxyl group is greater than or equal to the above lower limit, the adhesive force of the interlayer film is moderately heightened and the penetration resistance laminated glass is further enhanced. Moreover, when the content of the hydroxyl group is less than or equal to the above upper limit, the flexibility of the interlayer film is enhanced and the handling of the interlayer film is facilitated.

The content of the hydroxyl group of the second polyvinyl acetal resin is preferably greater than or equal to 10% by mole, more preferably greater than or equal to 15% by mole, further preferably greater than or equal to 17% by mole, preferably less than or equal to 30% by mole, more preferably less than or equal to 26% by mole and further preferably less than or equal to 24% by mole. The content of the hydroxyl group of the second polyvinyl acetal resin may be less than 25% by mole. When the content of the hydroxyl group is greater than or equal to the above lower limit, the adhesive force of the interlayer film is moderately heightened. Moreover, when the content of the hydroxyl group is less than or equal to the above upper limit, the flexibility of the interlayer film is enhanced and the handling of the interlayer film is facilitated.

The content of the hydroxyl group (the amount of hydroxyl groups) of the third polyvinyl acetal resin is preferably greater than or equal to 20% by mole, more preferably greater than or equal to 25% by mole, preferably less than or equal to 40% by mole and more preferably less than or equal to 36% by mole. When the content of the hydroxyl group is greater than or equal to the above lower limit, the adhesive force of the interlayer film is moderately heightened and the penetration resistance of laminated glass is further enhanced. Moreover, when the content of the hydroxyl group is less than or equal to the above upper limit, the flexibility of the interlayer film is enhanced and the handling of the interlayer film is facilitated.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6726 "Testing methods for polyvinyl alcohol" to be determined.

For example, the polyvinyl acetal resin can be produced by acetalizing polyvinyl alcohol with an aldehyde. For example, the polyvinyl alcohol can be obtained by saponifying polyvinyl acetate. The saponification degree of the polyvinyl alcohol generally lies within the range of 70 to 99.9% by mole.

The average polymerization degree of the polyvinyl alcohol is preferably greater than or equal to 200, more preferably greater than or equal to 500, still more preferably greater than or equal to 1000, still even more preferably greater than or equal to 1500, further preferably greater than or equal to 1600, preferably less than or equal to 3000, more preferably less than or equal to 2700 and further preferably less than or equal to 2400. When the average polymerization degree is greater than or equal to the above lower limit, the penetration resistance of laminated glass is further enhanced. When the average polymerization degree is less than or equal to the above upper limit, formation of an interlayer film is facilitated.

From the viewpoint of further enhancing the penetration resistance of laminated glass, it is especially preferred that the average polymerization degree of the polyvinyl alcohol be greater than or equal to 1500 and less than or equal to 3000.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin lie within the range of 3 to 5, and it is more preferred that the number of carbon atoms of the acetal group be 3 or 4. When the number of carbon atoms of the acetal group in the polyvinyl acetal resin is greater than or equal to 3, the glass transition temperature of the interlayer film is sufficiently lowered.

The aldehyde is not particularly limited. In general, an aldehyde with 1 to 10 carbon atoms is suitably used as the above-mentioned aldehyde. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, and benzaldehyde. Of these, propionaldehyde, n-butyraldehyde, isobutyraldehyde, n-hexylaldehyde or n-valeraldehyde is preferred, propionaldehyde, n-butyraldehyde or isobutyraldehyde is more preferred, and n-butyraldehyde is further preferred. One kind of the aldehyde may be used alone, and two or more kinds thereof may be used in combination.

The acetylation degree (the amount of acetyl groups) of the first polyvinyl acetal resin is preferably greater than or equal to 0.1% by mole, more preferably greater than or equal to 0.4% by mole, preferably less than or equal to 20% by mole, more preferably less than or equal to 5% by mole and further preferably less than or equal to 2% by mole. When the acetylation degree is greater than or equal to the above lower limit, the compatibility between the polyvinyl acetal resin and a plasticizer is heightened. When the acetylation degree is less than or equal to the above upper limit, with regard to the interlayer film and laminated glass, the moisture resistance thereof is enhanced.

The acetylation degree (the amount of acetyl groups) of the second polyvinyl acetal resin is preferably greater than or equal to 0.1% by mole, more preferably greater than or equal to 0.5% by mole, further preferably greater than or equal to 10% by mole, preferably less than or equal to 30% by mole and more preferably less than or equal to by mole. When the acetylation degree is greater than or equal to the above lower limit, the compatibility between the polyvinyl acetal resin and a plasticizer is heightened. When the acetylation degree is less than or equal to the above upper limit, the mechanical strength of the interlayer film is further heightened.

The acetylation degree (the amount of acetyl groups) of the third polyvinyl acetal resin is preferably greater than or equal to 0.1% by mole, more preferably greater than or equal to 0.4% by mole, preferably less than or equal to 20% by mole and more preferably less than or equal to 5% by mole. When the acetylation degree is greater than or equal to the above lower limit, the compatibility between the polyvinyl acetal resin and a plasticizer is heightened. When the acetylation degree is less than or equal to the above upper limit, with regard to the interlayer film and laminated glass, the moisture resistance thereof is enhanced.

The acetylation degree is a mole fraction, represented in percentage, obtained by dividing a value obtained by subtracting the amount of ethylene groups to which the acetal group is bonded and the amount of ethylene groups to which the hydroxyl group is bonded from the total amount of ethylene groups in the main chain by the total amount of ethylene groups in the main chain. For example, the amount of ethylene groups to which the acetal group is bonded can be measured in accordance with JIS K6728 "Testing methods for polyvinyl butyral".

The acetalization degree of the first polyvinyl acetal resin (the butyralization degree in the case of a polyvinyl butyral resin) is preferably greater than or equal to 55% by mole, more preferably greater than or equal to 60% by mole, further preferably greater than or equal to 65% by mole, especially preferably greater than or equal to 72% by mole, preferably less than or equal to 85% by mole and more preferably less than or equal to 80% by mole. When the acetalization degree is greater than or equal to the above lower limit, the compatibility between the polyvinyl acetal resin and a plasticizer is heightened. When the acetalization degree is less than or equal to the above upper limit, the reaction time required for producing the polyvinyl acetal resin is shortened.

The acetalization degree of the second polyvinyl acetal resin (the butyralization degree in the case of a polyvinyl butyral resin) is preferably greater than or equal to 50% by mole, more preferably greater than or equal to 60% by mole, preferably less than or equal to 85% by mole, more preferably less than or equal to 80% by mole and further preferably less than or equal to 70% by mole. When the acetalization degree is greater than or equal to the above lower limit, the compatibility between the polyvinyl acetal resin and a plasticizer is heightened. When the acetalization degree is less than or equal to the above upper limit, the reaction time required for producing the polyvinyl acetal resin is shortened.

The acetalization degree of the third polyvinyl acetal resin (the butyralization degree in the case of a polyvinyl butyral resin) is preferably greater than or equal to 55% by mole, more preferably greater than or equal to 60% by mole, preferably less than or equal to 85% by mole and more preferably less than or equal to 80% by mole. When the acetalization degree is greater than or equal to the above lower limit, the compatibility between the polyvinyl acetal resin and a plasticizer is heightened. When the acetalization degree is less than or equal to the above upper limit, the reaction time required for producing the polyvinyl acetal resin is shortened.

The acetalization degree is a mole fraction, represented in percentage, obtained by dividing the amount of ethylene groups to which the acetal group is bonded by the total amount of ethylene groups in the main chain. The acetalization degree can be calculated by a method in accordance with JIS K6728 "Testing methods for polyvinyl butyral".

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 may be used. In the case where the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

Since the penetration resistance of laminated glass is further enhanced, it is preferred that the second polyvinyl acetal resin be a polyvinyl acetal resin (A) with an acetylation degree (a) less than or equal to 8% by mole and an acetalization degree (a) greater than or equal to 66% by mole or a polyvinyl acetal resin (B) with an acetylation degree (b) greater than 8% by mole. Each of the second polyvinyl acetal resin and the third polyvinyl acetal resin may be the polyvinyl acetal resin (A) and may be the polyvinyl acetal resin (B).

The acetylation degree (a) of the polyvinyl acetal resin (A) is less than or equal to 8% by mole, preferably less than or equal to 7.5% by mole, more preferably less than or equal to 7% by mole, further preferably less than or equal to 6.5% by mole, especially preferably less than or equal to 5% by mole, preferably greater than or equal to 0.1% by mole, more preferably greater than or equal to 0.5% by mole, further preferably greater than or equal to 0.8% by mole and especially preferably greater than or equal to 1% by mole. When the acetylation degree (a) is less than or equal to the above upper limit and greater than or equal to the above lower limit, the transfer of a plasticizer can be easily controlled and the sound insulating properties of laminated glass are further heightened.

The acetalization degree (a) of the polyvinyl acetal resin (A) is greater than or equal to 66% by mole, preferably greater than or equal to 70% by mole, more preferably greater than or equal to 70.5% by mole, further preferably greater than or equal to 71% by mole, especially preferably greater than or equal to 71.5% by mole, most preferably greater than or equal to 72% by mole, preferably less than or equal to 85% by mole, more preferably less than or equal to 83% by mole, further preferably less than or equal to 81% by mole and especially preferably less than or equal to 79% by mole. When the acetalization degree (a) is greater than or equal to the above lower limit, the sound insulating properties of laminated glass are further heightened. When the acetalization degree (a) is less than or equal to the above upper limit, the reaction time required for producing the polyvinyl acetal resin (A) can be shortened.

The content (a) of the hydroxyl group of the polyvinyl acetal resin (A) is preferably greater than or equal to 18% by mole, more preferably greater than or equal to 19% by mole, further preferably greater than or equal to 20% by mole, especially preferably greater than or equal to 21% by mole, most preferably greater than or equal to 25% by mole, preferably less than or equal to 31% by mole, more preferably less than or equal to 30% by mole, further preferably less than or equal to 29% by mole and especially preferably less than or equal to 28% by mole. When the content (a) of the hydroxyl group is greater than or equal to the above lower limit, the adhesive force of the interlayer film is further heightened. When the content (a) of the hydroxyl group is less than or equal to the above upper limit, the sound insulating properties of laminated glass are further heightened.

The acetylation degree (b) of the polyvinyl acetal resin (B) is greater than 8% by mole, preferably greater than or equal to 9% by mole, more preferably greater than or equal to 9.5% by mole, further preferably greater than or equal to 10% by mole, especially preferably greater than or equal to 10.5% by mole, preferably less than or equal to 30% by mole, more preferably less than or equal to 28% by mole, further preferably less than or equal to 26% by mole and especially preferably less than or equal to 24% by mole. When the acetylation degree (b) is greater than or equal to the above lower limit, the sound insulating properties of laminated glass are further heightened. When the acetylation degree (b) is less than or equal to the above upper limit, the reaction time required for producing the polyvinyl acetal resin (B) can be shortened.

The acetalization degree (b) of the polyvinyl acetal resin (B) is preferably greater than or equal to 50% by mole, more preferably greater than or equal to 53% by mole, further preferably greater than or equal to 55% by mole, especially preferably greater than or equal to 60% by mole, preferably less than or equal to 80% by mole, more preferably less than or equal to 78% by mole, further preferably less than or equal to 76% by mole and especially preferably less than or equal to 74% by mole. When the acetalization degree (b) is greater than or equal to the above lower limit, the sound insulating properties of laminated glass are further heightened. When the acetalization degree (b) is less than or equal to the above upper limit, the reaction time required for producing the polyvinyl acetal resin (B) can be shortened.

The content (b) of the hydroxyl group of the polyvinyl acetal resin (B) is preferably greater than or equal to 18% by mole, more preferably greater than or equal to 19% by mole, further preferably greater than or equal to 20% by mole, especially preferably greater than or equal to 21% by mole, preferably less than or equal to 31% by mole, more preferably less than or equal to 30% by mole, further preferably less than or equal to 29% by mole, especially preferably less than or equal to 28% by mole and most preferably less than 25% by mole. When the content (b) of the hydroxyl group is greater than or equal to the above lower limit, the adhesive force of the interlayer film is further heightened. When the content (b) of the hydroxyl group is less than or equal to the above upper limit, the sound insulating properties of laminated glass are further heightened.

It is preferred that each of the first polyvinyl acetal resin, the second polyvinyl acetal resin and the third polyvinyl acetal resin be a polyvinyl butyral resin. It is preferred that each of the polyvinyl acetal resin (A) and the polyvinyl acetal resin (B) be a polyvinyl butyral resin.

With regard to the interlayer film, the content of the second polyvinyl acetal resin is preferably greater than or equal to 0.1% by weight, more preferably greater than or equal to 0.5% by weight, preferably less than or equal to 10% by weight and more preferably less than or equal to 5% by weight in 100% by weight of the total of the first polyvinyl acetal resin and the second polyvinyl acetal resin. When the content of the second polyvinyl acetal resin is greater than or equal to the above lower limit and less than or equal to the above upper limit, the transparency of the interlayer film is effectively enhanced.

The content of the second polyvinyl acetal resin is preferably greater than or equal to 0.1% by weight, more preferably greater than or equal to 0.5% by weight, preferably less than or equal to 10% by weight and more preferably less than or equal to 5% by weight in 100% by weight of the total of all polyvinyl acetal resins included in the interlayer film. When the content of the second polyvinyl acetal resin is greater than or equal to the above lower limit and less than or equal to the above upper limit, the transparency of the interlayer film is effectively enhanced.

The total content of the first polyvinyl acetal resin and the second polyvinyl acetal resin is preferably greater than or equal to 80% by weight, more preferably greater than or equal to 90% by weight, preferably less than 100% by weight or equal to 100% by weight (the whole amount), preferably less than or equal to 99.9% by weight, more preferably less than or equal to 99.5% by weight, further preferably less than or equal to 99% by weight and especially preferably less than or equal to 98% by weight in 100% by weight of the total of all polyvinyl acetal resins included in the interlayer film. When the total content of the first polyvinyl acetal resin and the second polyvinyl acetal resin is greater than or equal to the above lower limit and less than or equal to the above upper limit, the transparency of the interlayer film is effectively enhanced.

The content of the third polyvinyl acetal resin is preferably greater than or equal to 0.1% by weight, more preferably greater than or equal to 0.5% by weight, preferably less than or equal to 10% by weight and more preferably less than or equal to 5% by weight in 100% by weight of the total of all polyvinyl acetal resins included in the interlayer film. When the content of the third polyvinyl acetal resin is greater than or equal to the above lower limit and less than or equal to the above upper limit, the transparency of the interlayer film is effectively enhanced.

Although the content (part(s) by weight) of the second film material relative to 100 parts by weight of the first film material is not particularly limited, the content thereof is preferably greater than or equal to 0.5 part by weight, more preferably greater than or equal to 0.8 part by weight, further preferably greater than or equal to 1 part by weight, especially preferably greater than or equal to 2 parts by weight, most preferably greater than or equal to 2.5 parts by weight, preferably less than or equal to 15 parts by weight, more preferably less than or equal to 13 parts by weight, further preferably less than or equal to 10 parts by weight and especially preferably less than or equal to 8 parts by weight. When the content of the second film material relative to 100 parts by weight of the first film material is greater than or equal to the above lower limit and less than or equal to the above upper limit, the transparency of the interlayer film is effectively enhanced.

(Plasticizer)

The interlayer film includes a plasticizer. One kind of the plasticizer may be used alone, and two or more kinds thereof may be combinedly used.

Examples of the plasticizer include organic ester plasticizers such as a monobasic organic acid ester and a polybasic organic acid ester, organic phosphate plasticizers such as an organic phosphate plasticizer and an organic phosphite plasticizer. Of these, organic ester plasticizers are preferred. It is preferred that the plasticizer be a liquid plasticizer.

Examples of the monobasic organic acid ester include a glycol ester obtained by the reaction of a glycol with a monobasic organic acid. Examples of the glycol include triethylene glycol, tetraethylene glycol, and tripropylene glycol. Examples of the monobasic organic acid include butyric acid, isobutyric acid, caproic acid, 2-ethylbutyric acid, hepthylic acid, n-octylic acid, 2-ethylhexanoic acid, n-nonylic acid, and decylic acid.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, and azelaic acid.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic acid alkyd, and a mixture of a phosphoric acid ester and an adipic acid ester. Organic ester plasticizers other than these may be used. Other adipic acid esters other than the above-described adipic acid esters may be used.

Examples of the organic phosphate plasticizer include tributoxyethyl phosphate, isodecyl phenyl phosphate, and triisopropyl phosphate.

It is preferred that the plasticizer be a diester plasticizer represented by the following formula (1).

[Chemical 1]

Formula (1)

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate, it is more preferred that the plasticizer include triethylene glycol di-2-ethylhexanoate or triethylene glycol di-2-ethylbutyrate, and it is further preferred that the plasticizer include triethylene glycol di-2-ethylhexanoate.

The content of the plasticizer (all plasticizers) included in the interlayer film is preferably greater than or equal to 30 parts by weight, more preferably greater than or equal to 35 parts by weight, preferably less than or equal to 45 parts by weight and more preferably less than or equal to 40 parts by weight relative to 100 parts by weight of the polyvinyl acetal resin (all polyvinyl acetal resins) included in the interlayer film.

It is preferred that the first film material not contain a plasticizer or it is preferred that the first film material contain a plasticizer in an amount less than or equal to 50 parts by weight relative to 100 parts by weight of the first polyvinyl acetal resin. With regard to the first film material, the content (content (1)) of the plasticizer is preferably greater than or equal to 10 parts by weight, more preferably greater than or equal to 20 parts by weight, further preferably greater than or equal to 30 parts by weight, especially preferably greater than or equal to 35 parts by weight, preferably less than or equal to 50 parts by weight and more preferably less than or equal to 42 parts by weight relative to 100 parts by weight of the first polyvinyl acetal resin.

From the viewpoint of effectively enhancing the transparency, with regard to the second film material, the content (content (2)) of the plasticizer is preferably greater than or equal to 40 parts by weight, more preferably greater than or equal to 60 parts by weight, preferably less than or equal to 100 parts by weight, more preferably less than or equal to 95 parts by weight, further preferably less than or equal to 80 parts by weight and especially preferably less than or equal to 72 parts by weight relative to 100 parts by weight of the second polyvinyl acetal resin.

From the viewpoint of effectively enhancing the transparency, with regard to the third film material, the content (content (3)) of the plasticizer is preferably greater than or equal to 10 parts by weight, more preferably greater than or equal to 20 parts by weight, further preferably greater than or equal to 30 parts by weight, especially preferably greater than or equal to 35 parts by weight, preferably less than or equal to 50 parts by weight and more preferably less than or equal to 42 parts by weight relative to 100 parts by weight of the third polyvinyl acetal resin.

From the viewpoint of effectively enhancing the transparency, each of the absolute value of the difference between the content (1) and the content (2) and the absolute value of the difference between the content (2) and the content (3) is preferably greater than or equal to 10 parts by weight, more preferably greater than or equal to 15 parts by weight, preferably less than or equal to 50 parts by weight and more preferably less than or equal to parts by weight. From the viewpoint of effectively enhancing the transparency, it is preferred that the content (1) be less than the content (2), and it is preferred that the content (1) be less than the content (3).

(Other Ingredients)

The interlayer film may include additives such as an oxidation inhibitor, an ultraviolet ray shielding agent, a light stabilizer, a flame retardant, an antistatic agent, a pigment, a dye, an adhesive force regulating agent, a moisture-resistance improving agent, a fluorescent brightening agent and an infrared ray absorber, as necessary. One kind of these additives may be used alone, and two or more kinds thereof may be combinedly used.

(Other Details of Interlayer Film for Laminated Glass)

The thickness of the interlayer film according to the present invention is not particularly limited. From the viewpoint of the practical aspect and the viewpoint of sufficiently heightening the heat shielding properties, the thickness of the interlayer film is preferably greater than or equal to 0.1 mm, more preferably greater than or equal to 0.25 mm, preferably less than or equal to 3 mm and more preferably less than or equal to 1.5 mm. When the thickness of the interlayer film is greater than or equal to the above lower limit, the penetration resistance of laminated glass is enhanced. When the thickness of the interlayer film is lower than or equal to the above upper limit, the transparency of the interlayer film is further enhanced.

The production method of the interlayer film according to the present invention is not particularly limited. In the case of obtaining a single-layered interlayer film, examples of the production method of the interlayer film according to the present invention include a method of allowing a resin composition to be extruded using an extruder. In the case of allowing an interlayer film to be layered together with other interlayer films to obtain a multi-layered interlayer film, examples of the production method of the interlayer film according to the present invention include a method of separately forming respective resin compositions used for constituting respective layers into respective layers, and then, for example, allowing the respective obtained layers to be layered, a method of allowing respective resin compositions used for constituting respective layers to be coextruded using an extruder and allowing the respective layers to be layered, and the like. A production method of extrusion-molding is preferred because the method is suitable for continuous production.

The production method of the interlayer film according to the present invention includes the step of allowing the first film material and the second film material to be used and mixing the first film material and the second film material to obtain an interlayer film. In the case of using the third film material, the first film material, the second film material and the third film material are mixed to obtain an interlayer film.

(Laminated Glass)

Figure 3:
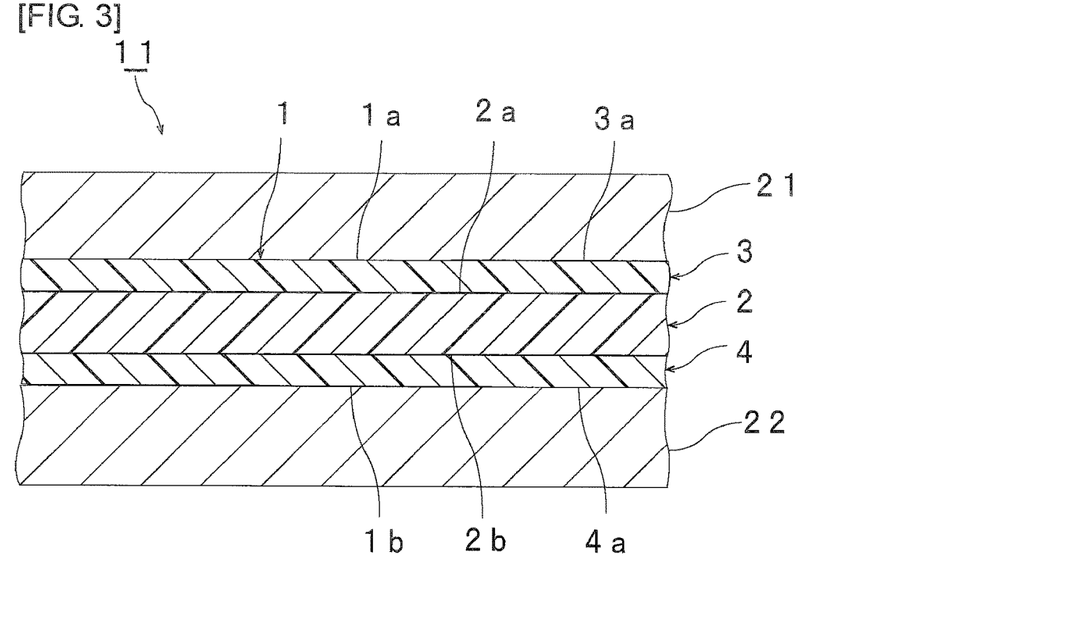
FIG. 3 is a partially cut-away sectional view schematically showing an example of laminated glass prepared with the multi-layered interlayer film shown in FIG. 1.

FIG. 3 shows an example of laminated glass prepared with a multi-layered interlayer film including an interlayer film for laminated glass in accordance with one embodiment of the present invention schematically represented as a sectional view.

Laminated glass 11 shown in FIG. 3 is provided with a first laminated glass member 21, a second laminated glass member 22 and an interlayer film 1. The interlayer film 1 is arranged between the first laminated glass member 21 and the second laminated glass member 22 to be sandwiched.

The first laminated glass member 21 is layered on a first surface 1a of the interlayer film 1. The second laminated glass member 22 is layered on a second surface 1b opposite to the first surface 1a of the interlayer film 1. The first laminated glass member 21 is layered on an outer surface 3a of a second layer 3 of the interlayer film 1. The second laminated glass member 22 is layered on an outer surface 4a of a third layer 4 of the interlayer film 1. The interlayer film 31 may be used in place of the interlayer film 1.

As described above, the laminated glass according to the present invention is provided with a first laminated glass member, a second laminated glass member and an interlayer film arranged between the first laminated glass member and the second laminated glass member, and the interlayer film includes the interlayer film for laminated glass according to the present invention. The interlayer film for laminated glass according to the present invention may be arranged alone between the first laminated glass member and the second laminated glass member, and may be arranged together with other interlayer films between the first laminated glass member and the second laminated glass member.

Examples of the laminated glass member include a glass plate, and a PET (polyethylene terephthalate) film. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that the first laminated glass member and the second laminated glass member be each a glass plate or a PET film, and it is preferred that the laminated glass be provided with a glass plate as at least one among the first laminated glass member and the second laminated glass member.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, and wired plate glass. The organic glass is synthetic resin glass substituted for inorganic glass. Examples of the organic glass include a polycarbonate plate, and a poly(meth)acrylic resin plate. Examples of the poly(meth)acrylic resin plate include a polymethyl (meth)acrylate plate.

The thickness of the laminated glass member is preferably greater than or equal to 1 mm, preferably less than or equal to 5 mm and more preferably less than or equal to 3 mm. Moreover, in the case where the laminated glass member is a glass plate, the thickness of the glass plate is preferably greater than or equal to 1 mm, preferably less than or equal to 5 mm and more preferably less than or equal to 3 mm. In the case where the laminated glass member is a PET film, the thickness of the PET film is preferably greater than or equal to 0.03 mm and preferably less than or equal to 0.5 mm.

The production method of the laminated glass is not particularly limited. For example, an interlayer film is sandwiched between the first laminated glass member and the second laminated glass member, and the air remaining between the first laminated glass member and the interlayer film and between the second laminated glass member and the interlayer film is removed by allowing the members to pass through a pressing roll or by putting the members into a rubber bag and allowing the contents to be sucked under reduced pressure. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

The interlayer film and the laminated glass can be used for automobiles, railway vehicles, aircraft, ships, buildings and the like. The interlayer film and the laminated glass can also be used for applications other than these applications. It is preferred that the interlayer film and the laminated glass be an interlayer film and laminated glass for vehicles or for building, and it is more preferred that the interlayer film and the laminated glass be an interlayer film and laminated glass for vehicles. The interlayer film and the laminated glass can be used for a windshield, side glass, rear glass or roof glass of an automobile and the like. The interlayer film and the laminated glass are suitably used for automobiles.

The haze value of laminated glass is preferably lower than or equal to 2%, more preferably lower than or equal to 1%, further preferably lower than or equal to 0.5% and especially preferably lower than or equal to 0.4%. The haze value of laminated glass can be measured in accordance with JIS K6714.

Hereinafter, the present invention will be described in more detail with reference to examples. The present invention is not limited only to these examples.

The following materials were used.
(Thermoplastic Resin)

In examples and comparative examples, polyvinyl acetal resins having a polymerization degree, a content of the hydroxyl group, an acetylation degree and an acetalization degree (a butyralization degree) which are shown in the following Table 1 were used. Any of the polyvinyl acetal resins used is a polyvinyl butyral resin prepared with n-butyraldehyde. The acetalization degree (the butyralization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

(Plasticizer)
3GO (triethylene glycol di-2-ethylhexanoate)

Example 1

Preparation of Interlayer Film

One hundred parts by weight of a polyvinyl acetal resin (n-butyraldehyde was used, the content of the hydroxyl group of 29.0% by mole, the acetylation degree of 0.8% by mole, the acetalization degree (the butyralization degree) of 70.2% by mole) and 40 parts by weight of a plasticizer (3GO) were mixed to obtain a first film material.

One hundred parts by weight of a polyvinyl acetal resin (n-butyraldehyde was used, the content of the hydroxyl group of 24.0% by mole, the acetylation degree of 12.5% by mole, the acetalization degree (the butyralization degree) of 63.5% by mole) and 60 parts by weight of a plasticizer (3GO) were mixed to obtain a second film material.

One hundred parts by weight of the first film material and 2.6 parts by weight of the second film material were fed into an extruder to be mixed, and by allowing the mixture to be extruded using the extruder, an interlayer film (800 μm in thickness) was obtained.

Preparation of Laminated Glass:

The interlayer film (multilayer) obtained was cut into a size of 80 nm in longitudinal length×80 mm in transversal length. Next, the interlayer film was sandwiched between two sheets of transparent float glass (80 mm in longitudinal length×80 mm in transversal length×2.5 mm in thickness), held in place for 30 minutes at 90° C. and pressed under vacuum with a vacuum laminator to obtain a laminate. With regard to the laminate, interlayer film portions protruded from the sheet of glass were cut away to obtain a sheet of laminated glass.

Examples 2 to 24

An interlayer film and a sheet of laminated glass were prepared in the same manner as that in Example 1 except that the kind and content of the polyvinyl acetal resin, the kind and content of the plasticizer and the content of the second film material relative to 100 parts by weight of the first film material were set to those listed in the following Tables 1 to 3.

(Evaluation)
(1) Measurement of Haze Value

The sheet of laminated glass obtained was measured for the haze value in accordance with JIS K6714 using a haze meter ("TC-H III DPK" available from Tokyo Denshoku Co., Ltd.).

The details and the results are shown in the following Tables 1 to 3.

TABLE 1

|  |  |  | Ex. 1 | Ex. 2 | Ex. 3 | Ex. 4 |
|---|---|---|---|---|---|---|
| First film material | Kind of first polyvinyl acetal resin | Acetalization degree (mol %) | 70.2 | 68.8 | 68.8 | 68.8 |
|  |  | Acetylation degree (mol %) | 0.8 | 0.8 | 0.8 | 0.8 |
|  |  | Content of hydroxyl group (mol %) | 29.0 | 30.4 | 30.4 | 30.4 |
|  |  | Polymerization degree of PVA | 1700 | 1700 | 1700 | 1700 |
|  | Content of first polyvinyl acetal resin | Parts by weight | 100 | 100 | 100 | 100 |
|  | Kind of plasticizer |  | 3GO | 3GO | 3GO | 3GO |
|  | Content of plasticizer | Parts by weight | 40 | 40 | 40 | 40 |

TABLE 1-continued

|  |  |  | Ex. 1 | Ex. 2 | Ex. 3 | Ex. 4 |
|---|---|---|---|---|---|---|
| Second film material | Kind of second polyvinyl acetal resin | Acetalization degree (mol %) | 63.5 | 63.5 | 64.8 | 65.5 |
|  |  | Acetylation degree (mol %) | 12.5 | 12.5 | 12.5 | 12.5 |
|  |  | Content of hydroxyl group (mol %) | 24.0 | 24.0 | 22.7 | 22.0 |
|  |  | Polymerization degree of PVA | 3000 | 3000 | 3000 | 3000 |
|  | Content of second polyvinyl acetal resin | Parts by weight | 100 | 100 | 100 | 100 |
|  | Kind of plasticizer |  | 3GO | 3GO | 3GO | 3GO |
|  | Content of plasticizer | Parts by weight | 60 | 60 | 60 | 60 |
| Absolute value of difference between content ratios of hydroxyl group of first and second polyvinyl acetal resins |  |  | 5.0 | 6.4 | 7.7 | 8.4 |
| Content of second film material relative to 100 parts by weight of first film material |  |  | 2.6 | 2.2 | 1.1 | 0.8 |
| Haze value (%) |  |  | 0.3 | 0.3 | 0.3 | 0.3 |

TABLE 2

|  |  |  | Ex. 5 | Ex. 6 | Ex. 7 | Ex. 8 | Ex. 9 |
|---|---|---|---|---|---|---|---|
| First film material | Kind of first polyvinyl acetal resin | Acetalization degree (mol %) | 68.8 | 68.8 | 68.8 | 68.8 | 68.8 |
|  |  | Acetylation degree (mol %) | 0.8 | 0.8 | 0.8 | 0.8 | 0.8 |
|  |  | Content of hydroxyl group (mol %) | 30.4 | 30.4 | 30.4 | 30.4 | 30.4 |
|  |  | Polymerization degree of PVA | 1700 | 1700 | 1700 | 1700 | 1700 |
|  | Content of first polyvinyl acetal resin | Parts by weight | 100 | 100 | 100 | 100 | 100 |
|  | Kind of plasticizer |  | 3GO | 3GO | 3GO | 3GO | 3GO |
|  | Content of plasticizer | Parts by weight | 40 | 40 | 40 | 40 | 40 |
| Second film material | Kind of second polyvinyl acetal resin | Acetalization degree (mol %) | 63.5 | 66.5 | 59.0 | 65.5 | 63.5 |
|  |  | Acetylation degree (mol %) | 12.5 | 12.5 | 12.5 | 12.5 | 12.5 |
|  |  | Content of hydroxyl group (mol %) | 24.0 | 21.0 | 28.5 | 22.0 | 24.0 |
|  |  | Polymerization degree of PVA | 3000 | 3000 | 3000 | 2300 | 1700 |
|  | Content of second polyvinyl acetal resin | Parts by weight | 100 | 100 | 100 | 100 | 100 |
|  | Kind of plasticizer |  | 3GO | 3GO | 3GO | 3GO | 3GO |
|  | Content of plasticizer | Parts by weight | 60 | 60 | 60 | 60 | 60 |
| Absolute value of difference between content ratios of hydroxyl group of first and second polyvinyl acetal resins |  |  | 5.0 | 9.4 | 1.9 | 8.4 | 6.4 |
| Content of second film material relative to 100 parts by weight of first film material |  |  | 4.0 | 4.0 | 6.7 | 4.0 | 4.0 |
| Haze value (%) |  |  | 1.3 | 1.6 | 1.5 | 1.3 | 1.2 |

|  |  |  | Ex. 10 | Ex. 11 | Ex. 12 | Ex. 13 | Ex. 14 |
|---|---|---|---|---|---|---|---|
| First film material | Kind of first polyvinyl acetal resin | Acetalization degree (mol %) | 68.8 | 68.8 | 68.8 | 68.8 | 68.8 |
|  |  | Acetylation degree (mol %) | 0.8 | 0.8 | 0.8 | 0.8 | 0.8 |
|  |  | Content of hydroxyl group (mol %) | 30.4 | 30.4 | 30.4 | 30.4 | 30.4 |
|  |  | Polymerization degree of PVA | 1700 | 1700 | 1700 | 1700 | 1700 |
|  | Content of first polyvinyl acetal resin | Parts by weight | 100 | 100 | 100 | 100 | 100 |
|  | Kind of plasticizer |  | 3GO | 3GO | 3GO | 3GO | 3GO |
|  | Content of plasticizer | Parts by weight | 40 | 40 | 40 | 40 | 40 |
| Second film material | Kind of second polyvinyl acetal resin | Acetalization degree (mol %) | 59.0 | 55.7 | 55.7 | 78.1 | 81.7 |
|  |  | Acetylation degree (mol %) | 12.5 | 23.5 | 23.5 | 0.8 | 0.8 |
|  |  | Content of hydroxyl group (mol %) | 28.5 | 20.8 | 20.8 | 21.1 | 17.5 |
|  |  | Polymerization degree of PVA | 1700 | 3000 | 2300 | 3000 | 3000 |
|  | Content of second polyvinyl acetal resin | Parts by weight | 100 | 100 | 100 | 100 | 100 |
|  | Kind of plasticizer |  | 3GO | 3GO | 3GO | 3GO | 3GO |
|  | Content of plasticizer | Parts by weight | 60 | 60 | 60 | 60 | 60 |
| Absolute value of difference between content ratios of hydroxyl group of first and second polyvinyl acetal resins |  |  | 1.9 | 9.6 | 9.6 | 9.3 | 12.9 |
| Content of second film material relative to 100 parts by weight of first film material |  |  | 12.7 | 4.0 | 4.0 | 4.0 | 4.0 |
| Haze value (%) |  |  | 1.6 | 1.7 | 1.4 | 1.4 | 1.7 |

TABLE 3

|  |  |  | Ex. 15 | Ex. 16 | Ex. 17 | Ex. 18 | Ex. 19 |
|---|---|---|---|---|---|---|---|
| First film material | Kind of first polyvinyl acetal resin | Acetalization degree (mol %) | 68.8 | 68.8 | 68.8 | 68.8 | 68.8 |
|  |  | Acetylation degree (mol %) | 0.8 | 0.8 | 0.8 | 0.8 | 0.8 |
|  |  | Content of hydroxyl group (mol %) | 30.4 | 30.4 | 30.4 | 30.4 | 30.4 |
|  |  | Polymerization degree of PVA | 1700 | 1700 | 1700 | 1700 | 1700 |
|  | Content of first polyvinyl acetal resin | Parts by weight | 100 | 100 | 100 | 100 | 100 |
|  | Kind of plasticizer |  | 3GO | 3GO | 3GO | 3GO | 3GO |
|  | Content of plasticizer | Parts by weight | 40 | 40 | 40 | 40 | 40 |

TABLE 3-continued

| | | | Ex. 15 | Ex. 16 | Ex. 17 | Ex. 18 | Ex. 19 |
|---|---|---|---|---|---|---|---|
| Second film material | Kind of second polyvinyl acetal resin | Acetalization degree (mol %) | 80.7 | 78.1 | 81.7 | 80.7 | 78.1 |
| | | Acetylation degree (mol %) | 0.5 | 0.8 | 0.8 | 0.5 | 0.8 |
| | | Content of hydroxyl group (mol %) | 18.8 | 21.1 | 17.5 | 18.8 | 21.1 |
| | | Polymerization degree of PVA | 3000 | 3000 | 3000 | 3000 | 1700 |
| | Content of second polyvinyl acetal resin | Parts by weight | 100 | 100 | 100 | 100 | 100 |
| | Kind of plasticizer | | 3GO | 3GO | 3GO | 3GO | 3GO |
| | Content of plasticizer | Parts by weight | 60 | 60 | 60 | 60 | 60 |
| | Absolute value of difference between content ratios of hydroxyl group of first and second polyvinyl acetal resins | | 11.6 | 9.3 | 12.9 | 11.6 | 9.3 |
| | Content of second film material relative to 100 parts by weight of first film material | | 4.0 | 4.0 | 4.0 | 4.0 | 4.0 |
| | Haze value (%) | | 1.6 | 1.2 | 1.6 | 1.4 | 1.1 |

| | | | Ex. 20 | Ex. 21 | Ex. 22 | Ex. 23 | Ex. 24 |
|---|---|---|---|---|---|---|---|
| First film material | Kind of first polyvinyl acetal resin | Acetalization degree (mol %) | 68.8 | 68.8 | 68.8 | 68.8 | 68.8 |
| | | Acetylation degree (mol %) | 0.8 | 0.8 | 0.8 | 0.8 | 0.8 |
| | | Content of hydroxyl group (mol %) | 30.4 | 30.4 | 30.4 | 30.4 | 30.4 |
| | | Polymerization degree of PVA | 1700 | 1700 | 1700 | 1700 | 1700 |
| | Content of first polyvinyl acetal resin | Parts by weight | 100 | 100 | 100 | 100 | 100 |
| | Kind of plasticizer | | 3GO | 3GO | 3GO | 3GO | 3GO |
| | Content of plasticizer | Parts by weight | 40 | 40 | 40 | 40 | 40 |
| Second film material | Kind of second polyvinyl acetal resin | Acetalization degree (mol %) | 81.7 | 80.7 | 70.0 | 70.0 | 70.0 |
| | | Acetylation degree (mol %) | 0.8 | 0.5 | 7.6 | 7.6 | 7.6 |
| | | Content of hydroxyl group (mol %) | 17.5 | 18.8 | 22.4 | 22.4 | 22.4 |
| | | Polymerization degree of PVA | 1700 | 1700 | 3000 | 2300 | 1700 |
| | Content of second polyvinyl acetal resin | Parts by weight | 100 | 100 | 100 | 100 | 100 |
| | Kind of plasticizer | | 3GO | 3GO | 3GO | 3GO | 3GO |
| | Content of plasticizer | Parts by weight | 60 | 60 | 60 | 60 | 60 |
| | Absolute value of difference between content ratios of hydroxyl group of first and second polyvinyl acetal resins | | 12.9 | 11.6 | 8.0 | 8.0 | 8.0 |
| | Content of second film material relative to 100 parts by weight of first film material | | 4.0 | 4.0 | 4.0 | 4.0 | 4.0 |
| | Haze value (%) | | 1.4 | 1.2 | 1.4 | 1.3 | 1.1 |

In this connection, although specific examples in which fresh materials (raw materials) that have not been used for obtaining an interlayer film were used as the first film material and the second film material were shown, from the viewpoint of enhancing the recyclability to reduce the environmental load, it is preferred that a recovered material (a recovered interlayer film), which has been used at least one time for obtaining an interlayer film, be used, and even in such a case, it was confirmed that the effect of the present invention is attained. Furthermore, even in the case where a third film material was used together with the first film material and the second film material, it was confirmed that the effect of the present invention is attained.

EXPLANATION OF SYMBOLS

1: Interlayer film (multi-layered interlayer film)
1a: First surface
1b: Second surface
2: First layer (interlayer film)
2a: First surface
2b: Second surface
3: Second layer (interlayer film)
3a: Outer surface
4: Third layer (interlayer film)
4a: Outer surface
11: Laminated glass
21: First laminated glass member
22: Second laminated glass member
31: Interlayer film (single-layered interlayer film)

The invention claimed is:
1. An interlayer film for laminated glass,
said interlayer film being obtained by mixing a first film material containing a first polyvinyl acetal resin and a plasticizer component and a second film material containing a second polyvinyl acetal resin and a plasticizer component, the second polyvinyl acetal resin being different from the first polyvinyl acetal resin, the plasticizer component in each of the first film material and the second film material consisting of a diester plasticizer represented by the formula (1):

Formula (1)

in which R1 and R2 each represent an organic group with 2 to 10 carbon atoms, R3 represents an ethylene group, an isopropylene group or an n-propylene group, and p represents an integer of 3 to 10,
each of the first film material and the second film material containing at least one kind of a monobasic organic acid ester and a polybasic organic acid ester, the at least one kind of a monobasic organic acid ester and a polybasic organic acid ester contained in each of the first film material and the second film material consisting of the diester plasticizer represented by the formula (1),
a content of the diester plasticizer represented by the formula (1) in the interlayer film being greater than or equal to 30 parts by weight relative to 100 parts by weight of all polyvinyl acetal resins in the interlayer film,
wherein the absolute value of the difference between the content of the hydroxyl group of the first polyvinyl acetal resin contained together with the plasticizer component in the first film material and the content of the hydroxyl group of the second polyvinyl acetal resin contained together with the plasticizer component in the second film material is less than or equal to 13% by mole, the content of the second polyvinyl acetal resin is 0.1% by weight to 2.225% by weight per 100% by weight of the total combined weights of the first polyvinyl acetal resin and the second polyvinyl acetal resin, and the second film material contains the plasticizer component in an amount of 40 parts by weight to 80 parts by weight relative to 100 parts by weight of the second polyvinyl acetal resin.

2. The interlayer film for laminated glass according to claim 1, wherein the content of the hydroxyl group of the first polyvinyl acetal resin contained together with the plasticizer component in the first film material is higher than the content of the hydroxyl group of the second polyvinyl acetal resin contained together with the plasticizer component in the second film material.

3. The interlayer film for laminated glass according to claim 1, wherein the content of the second polyvinyl acetal resin is 0.1% by weight to 2.225% by weight per 100% by weight of the total combined weights of all polyvinyl acetal resins included in the interlayer film.

4. The interlayer film for laminated glass according to claim 1, wherein the second film material contains the plasticizer component in an amount of 40 parts by weight to 72 parts by weight relative to 100 parts by weight of the second polyvinyl acetal resin.

5. The interlayer film for laminated glass according to claim 1, wherein the first film material is a fresh material which has not been used for obtaining an interlayer film.

6. The interlayer film for laminated glass according to claim 1, wherein the second film material is a recovered material which has been used at least one time for obtaining an interlayer.

7. The interlayer film for laminated glass according to claim 1, being obtained by mixing the first film material, the second film material and a third film material containing a third polyvinyl acetal resin and a plasticizer component, wherein the absolute value of the difference between the content of the hydroxyl group of the first polyvinyl acetal resin contained together with the plasticizer component in the first film material and the content of the hydroxyl group of the third polyvinyl acetal resin contained together with the plasticizer component in the third film material is less than or equal to 13% by mole.

8. The interlayer film for laminated glass according to claim 7, wherein the content of the hydroxyl group of the first polyvinyl acetal resin contained together with the plasticizer component in the first film material is higher than the content of the hydroxyl group of the third polyvinyl acetal resin contained together with the plasticizer component in the third film material.

9. The interlayer film for laminated glass according to claim 7, wherein the third film material is a recovered material which has been used at least one time for obtaining an interlayer film.

10. A method for producing an interlayer film for laminated glass, said method comprising the steps of:

providing a first film material containing a first polyvinyl acetal resin and a plasticizer component and a second film material containing a second polyvinyl acetal resin and a plasticizer component and mixing the first film material and the second film material to obtain an interlayer film for laminated glass, the second polyvinyl acetal resin being different from the first polyvinyl acetal resin, the plasticizer component in each of the first film material and the second film material consisting of a diester plasticizer represented by the formula (1):

Formula (1)

in which R1 and R2 each represent an organic group with 2 to 10 carbon atoms, R3 represents an ethylene group, an isopropylene group or an n-propylene group, and p represents an integer of 3 to 10, each of the first film material and the second film material containing at least one kind of a monobasic organic acid ester and a polybasic organic acid ester, the at least one kind of a monobasic organic acid ester and a polybasic organic acid ester contained in each of the first film material and the second film material consisting of the diester plasticizer represented by the formula (1), a content of the diester plasticizer represented by the formula (1) in the interlayer film being greater than or equal to 30 parts by weight relative to 100 parts by weight of all polyvinyl acetal resins in the interlayer film, wherein the absolute value of the difference between the content of the hydroxyl group of the first polyvinyl acetal resin contained together with the plasticizer component in the first film material and the content of the hydroxyl group of the second polyvinyl acetal resin contained together with the plasticizer component in the second film material is less than or equal to 13% by mole, the content of the second polyvinyl acetal resin is 0.1% by weight to 2.225% by weight per 100% by weight of the total combined weights of the first polyvinyl acetal resin and the second polyvinyl acetal resin, and the second film material contains the plasticizer component in an amount of 40 parts by weight to 80 parts by weight relative to 100 parts by weight of the second polyvinyl acetal resin.

11. The method for producing an interlayer film for laminated glass according to claim 10, wherein the content of the hydroxyl group of the first polyvinyl acetal resin contained together with the plasticizer component in the first film material is higher than the content of the hydroxyl group of the second polyvinyl acetal resin contained together with the plasticizer component in the second film material.

12. A laminated glass, comprising a first laminated glass member, a second laminated glass member and an interlayer film for laminated glass according to claim 1, wherein the interlayer film for laminated glass is arranged between the first laminated glass member and the second laminated glass member.

13. The method for producing an interlayer film for laminated glass according to claim 10, wherein all plasticizers in the interlayer film consist of the diester plasticizer represented by the formula (1).

14. The interlayer film for laminated glass according to claim 1, wherein all plasticizers in the interlayer film consist of the diester plasticizer represented by the formula (1), and the content of the diester plasticizer represented by the formula (1) in the interlayer film is greater than or equal to 35 parts by weight relative to 100 parts by weight of all the polyvinyl acetal resins in the interlayer film.

15. The method for producing an interlayer film for laminated glass according to claim 10,
wherein the content of all diester plasticizers represented by the formula (1) in the interlayer film is greater than or equal to 35 parts by weight relative to 100 parts by weight of all the polyvinyl acetal resins in the interlayer film.

16. The interlayer film for laminated glass according to claim 1, wherein an acetylation degree of the second polyvinyl acetal resin is greater than or equal to 9.5% by mole.

17. The interlayer film for laminated glass according to claim 16, wherein an acetylation degree of the second polyvinyl acetal resin is greater than or equal to 10.5% by mole.

18. The interlayer film for laminated glass according to claim 1, wherein the second film material consists of the second polyvinyl acetal resin, the diester plasticizer represented by the formula (1), and optionally, one or more selected from the group consisting of an oxidation inhibitor, an ultraviolet ray shielding agent, a light stabilizer, a flame retardant, an antistatic agent, a pigment, a dye, an adhesive force regulating agent, a moisture-resistance improving agent, a fluorescent brightening agent, and an infrared ray absorber.

19. The interlayer film for laminated glass according to claim 1, further comprising a flame retardant.

\* \* \* \* \*